United States Patent
Gambin et al.

(10) Patent No.: US 8,048,217 B2
(45) Date of Patent: Nov. 1, 2011

(54) POWDERY COMPOSITION BASED ON A CALCO-MAGNESIAN COMPOUND

(75) Inventors: Amandine Gambin, Ternuay (FR); Alain Laudet, Namur (BE); Olivier Francoisse, Céroux-Mousty (BE)

(73) Assignee: S. A.Lhoist Recherche et Developpement (BE)

( * ) Notice: Subject to any disclaimer, the term of this patent is extended or adjusted under 35 U.S.C. 154(b) by 823 days.

(21) Appl. No.: 10/583,048

(22) PCT Filed: Dec. 14, 2004

(86) PCT No.: PCT/EP2004/053437
§ 371 (c)(1),
(2), (4) Date: Jun. 15, 2006

(87) PCT Pub. No.: WO2005/070830
PCT Pub. Date: Aug. 4, 2005

(65) Prior Publication Data
US 2007/0107637 A1    May 17, 2007

(30) Foreign Application Priority Data
Dec. 24, 2003  (BE) .................................. 2003/0684

(51) Int. Cl.
C09C 1/02     (2006.01)
C04B 14/00    (2006.01)
C04B 16/00    (2006.01)
C04B 24/00    (2006.01)
C04B 28/00    (2006.01)

(52) U.S. Cl. ........................................ 106/461; 106/721

(58) Field of Classification Search ............... 106/461, 106/721
See application file for complete search history.

(56) References Cited

U.S. PATENT DOCUMENTS

| | | | | |
|---|---|---|---|---|
| 3,598,624 A | | 8/1971 | Kaufman et al. | 106/306 |
| 3,738,938 A | | 6/1973 | Barrett | 252/188.3 |
| 4,051,056 A | * | 9/1977 | Hartman | 510/369 |
| 4,781,759 A | * | 11/1988 | Smith | 106/36 |
| 5,340,558 A | * | 8/1994 | Friedman et al. | 423/328.1 |
| 5,422,092 A | | 6/1995 | Miyata | 423/635 |
| 6,136,085 A | | 10/2000 | Adams, Jr. et al. | 106/463 |
| 2003/0138614 A1 | * | 7/2003 | Leclercq | 428/292.1 |

FOREIGN PATENT DOCUMENTS

| | | | |
|---|---|---|---|
| JP | 09-268012 | * | 10/1997 |
| JP | 10-001345 | * | 1/1998 |
| WO | PCT/EP95/03053 | | 8/1995 |
| WO | WO 01/40576 | | 6/2001 |

* cited by examiner

*Primary Examiner* — Shuangyi Abu Ali
(74) *Attorney, Agent, or Firm* — Charles D. Gunter, Jr.

(57) ABSTRACT

The invention relates to a powder composition based on a calcium/magnésium compound having formula (I), xCaA.(1−x)[yMgA+(1−y)MgO], in which A is a group =(OH)$_2$ or =CO$_3$ and x and y are mole fractions where 0<x=1 and 0=y=1, containing an amount of mineral solid flow agent that is less than 5 wt.-% of the composition, said agent being selected from the group containing vermiculite, perlite, diatomaceous earth and silica, in the form of particles having a size greater than 90 μm.

10 Claims, 1 Drawing Sheet

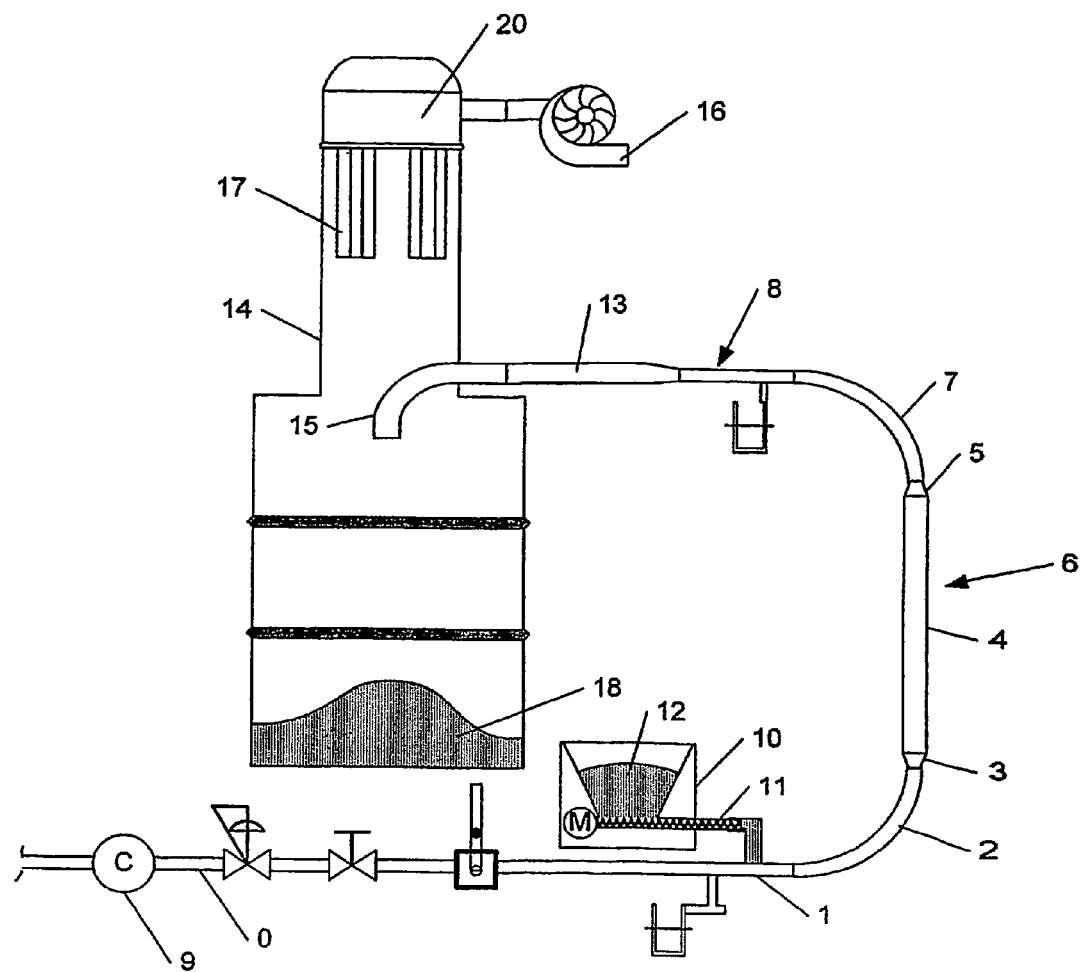

POWDERY COMPOSITION BASED ON A CALCO-MAGNESIAN COMPOUND

BACKGROUND OF THE INVENTION

1. Field of the Invention

The present invention relates to a composition based on a calcic compound, sometimes referred to herein as a powdery calco-magnesian compound.

2. Description of the Prior Art

Powdery calco-magnesian compound means a collection of solid particles, either in hydroxide form or in the form of a carbonate, complying with the following formula I:

$$xCaA.(1-x)[yMgA+(1-y)MgO], \quad (I)$$

in which
A is a $=(OH)_2$ or $=CO_3$ group, and
x and y are molar fractions where $0<x\leqq1$ and $0\leqq y\leqq1$.

This calco-magnesian material obviously contains impurities, such as silica, alumina, etc, to the extent of a few percent. In general terms, the size of the particles of this powdery materials is entirely less than 1 mm and often less than 250 μm.

A particular case of a powdery calco-magnesian compound is slaked lime, also referred to as hydrated lime (calcium hydroxide—$Ca(OH)_2$), which can also comprise impurities, such as silica, alumina, magnesium oxide or calcium carbonate, to the extent of a few percent, and contain free water, namely water not chemically bound to the compound, up to approximately 5%.

Such a compound is renowned for its lacks of flowability in flowing during storage, handling and transport, in particular pneumatic transport in dilute phase, often used in the case of slaked lime. These problems of flowing, in particular related to the fineness of the particles of the hydrated lime, exhibit themselves mainly in the form of an agglomeration of particles together or an accumulation of these on the walls. Such behaviour is detrimental to the use of said compound:
  in reducing the flow rate during pneumatic transport by progressive deposition of the compound on the walls, which may go as far as the blockage of the installations,
  by interfering with regulation when the compound is used as a neutraliser of acidic compounds,
  requiring specific and regular maintenance operations at places which are sometimes not very accessible.

It is known how to promote the flow of powders by means of organic liquid additives, in particular surfactants [JP 08-109016, JP 09-165 216]. However, the incorporation of such organic liquids, which are sometimes toxic, to a mineral compound such as slaked lime, is often contrary to its application, in particular in the case of use for the purification of flue gas (the problem of volatile organic compounds, following on from the release of organic additives).

SUMMARY OF THE INVENTION

The aim of the present invention is to obtain a powdery composition based on a calco-magnesian compound, with a high purity and entirely mineral, that limits the lacks of flowability described above, without having recourse to an organic additive.

According to the invention the above problem is resolved by means of a powdery composition based on a calco-magnesian compound complying with formula I given above, which contains, in a quantity of less than 5% by weight of the said composition, a mineral solid flowing agent chosen from amongst the group consisting of vermiculite, perlite, diatomaceous earth and silica, in the form of particles having a size greater than 90 μm.

Size greater than a given value means that at least 95% of the particles will have this greater size as a minimum.

BRIEF DESCRIPTION OF THE DRAWINGS

FIG. 1 is a flow diagram, partly schematic, showing the powder transport loop of the invention.

DETAILED DESCRIPTION OF THE INVENTION

Many methods make it possible to describe the flow of powdery products such as slaked lime. These diagnosis methods are based in particular on the use of shear cells, in particular the Jenike cell, or on the determination of the flowing index, based on Carr's theory or on the dissemination of friction and fall angles.

However, the flow diagnosis methods referred to above, always related to a flow under stress ("static" methods), do not make it possible to discriminate the various powdery compositions based on calco-magnesian compounds in their behaviour under flowing in pneumatic (dynamic) transport, namely during a true flow of the powder in dilute phase in an air flow.

It has therefore seemed necessary to develop a diagnosis method appropriate to the flow of powdery products in pneumatic transport. This method consists of applying a dynamic adhesion test (DAT) that is performed in a specific device.

This device is illustrated in the accompanying single FIGURE.

It comprises a powder transport loop, formed from a succession of rectilinear conduits 1, 6 and 8 connected by elbows 2 and 7. The rectilinear conduit 1 has a length of 10 cm downstream of the powder injection point and an inside diameter of 2.54 cm, and the rectilinear conduit 8 a length of 27.5 cm and an inside diameter of 2.54 cm. The rectilinear conduit 6 is composed of a broadening 3 with a length of 8.90 cm and an inlet diameter of 2.54 cm, a sleeve 4 with a length of 30 cm and an inside diameter of 4.25 cm, and a reduction 5 with a length of 9.85 cm and an outlet diameter of 2.54 cm. The elbows 2 and 7 that connect them have a radius of curvature of 20 cm.

The device also comprises a compressed air source, in the form of a compressor 9 that introduces compressed dry air into the conduit 0. A dosing "device" (or "apparatus") 10 provided with a conveyor screw 11 feeds the powdery substance 12 to be studied into the conduit 1.

The outlet from the last rectilinear conduit 8 is connected to a flexible pipe 13 that enters a reservoir 14 through a downward-directed elbow 15. A suction fan 16 with a power of 1200 W and provided with a filter 17 with a total filtering surface of 1.2 m² is arranged at the top 20 of the reservoir 14. The powdery substance that is passed through the conduits accumulates at the bottom of the reservoir 18.

The powder, fed by means of a dosing device 10, is carried in the circuit by the air flow generated therein. The total weight of powder deposited on the various walls of the elements 1 to 8 is determined by weighing, after the test. This total weight of powder deposited is referred to the integral of the measured weight and is an inverse measurement of the quality of the flow of the powder by pneumatic transport in dilute phase in air.

The results of the test described above have appeared to be consistent with experience of industrial use of powdery calco-magnesian compounds, namely that this test effectively distinguishes the products presenting problems of dynamic flowing from those that have satisfactory behaviour.

It is found in particular that, all other things being equal, a calco-magnesian compound will have a dynamic flow in dilute phase that is less good, the finer the size of its particles.

In order to improve the dynamic flowing of calco-magnesian compounds, the mineral solid additive was initially chosen from amongst powdery compounds deemed to prevent the formation of clots, to prevent agglomeration or to be "flowing agents"; mainly talc, silica, sepiolite, vermiculite, bentonite, diatomaceous earth and limestone can be cited, as well as magnesium carbonate, oxide and hydroxide.

Surprisingly, not all the additives preventing agglomeration cited above systematically improve the dynamic flow of powdery compositions based on calco-magnesian compounds, within the meaning of the problem posed by the present invention. In particular, the addition of talc, known to be a lubricating agent, does not afford any positive effect on dynamic flow, or even degrades it. The same observation is made when sepiolite or bentonite is used as an additive.

The use of magnesium carbonate, oxide or hydroxide as an additive results only in a slight improvement in the results of the dynamic flow test, an improvement that is insufficient to resolve the problems of flow mentioned above.

On the other hand, unpredictably, the addition according to the invention of vermiculite, in particular "raw", perlite or a diatomaceous earth, especially attapulgite, or silica, in particular sand, leads to significant improvements in the dynamic flowing of powdery compositions based on calco-magnesian compounds.

The powdery composition based on calco-magnesian compound according to the invention contains one or other or a combination of mineral additives from amongst silica, in particular sand, vermiculite, perlite or diatomaceous earth, in particular attapulgite, at less than 5% by weight, preferably no more than 3%, and very advantageously no more than 2% by weight of the composition. It is necessary to maintain the calco-magnesian compound purity in the composition according to the invention at a value greater than 90%, preferably greater than 92%, in order to limit the dilution of the active calco-magnesian compound and to preserve performance in the applications sought.

In addition, the aforementioned mineral additive will have a fairly coarse particle size distribution. This is because, unlike the teaching of documents that cite microsilica (fumed silicon oxide) or finely divided minerals as additives, the additive incorporated in the calco-magnesian compound according to the present invention will have to have a particle size essentially greater than 90 µm and preferably greater than 250 µm.

Unexpectedly, the powdery compositions based on calco-magnesian compounds according to the invention have good dynamic flowing in dilute phase, without any limitation on the fineness of their particles, contrary to the observations made in the case of conventional calco-magnesian compounds without additive where in particular particle sizes of less than 20 µm have the effect of a rapid blocking of pneumatic installations. This property of the compounds according to the invention makes it possible to broaden their field of application. This is because a fine product will react better, in particular in many applications of hydrated lime, such as the purification of flue gases.

The invention will now be described in more detail by means of non-limiting examples.

Example 1

An industrial-production slaked lime was chosen as a reference calco-magnesian compound. Its purity is 95% by weight of $Ca(OH)_2$; it has a particle size distribution of up to 250 µm and a free water content of 1%. This lime is introduced into the dosing device of the dynamic flowing test described above.

The device is supplied with dry compressed air (dew point 3° C.), pre heated to 30° C., at a flow rate of 25 $m^3/h$, which provides an initial speed of approximately 14 m/s. The reference slaked lime is apportioned at 1 kg/h. The test provides that 2 kg of material is thus measured out.

At the end of the experiment, the weight of slaked lime that has accumulated on the walls of all the conduits was determined and compared with the total weight measured out, namely 2 kg. In the case of the reference slaked lime, the result is 65 g/kg.

According to the calibration of the dynamic test of the present invention with respect to the quality of the flow of products used industrially, the compounds having as a test result less than 45 g/kg of product accumulated on the walls must be considered to have very good behaviour under dynamic flowing in dilute phase. In the same way, the compound for which the result of the test is greater than 58 g/kg of product accumulated on the walls is considered to have a behaviour in flow posing problems in industrial use, in particular during pneumatic transport in dilute phase.

Example 2

In this example 2, additives that are industrial products, used as delivered, are added to the same slaked lime as in example 1.

According to the invention, "raw" vermiculite is added, to the extent of 2% by weight of the composition thus obtained, which is mixed in order to homogenise it. The size of the particles of this additive is greater than 90 µm. The composition is then subjected to the dynamic flowing test, under the same conditions as in example 1.

In the case of the present mixture of slaked lime and raw vermiculite, the result of the test is 40 g/kg of product accumulated on the walls, which classifies this composition amongst those having very good behaviour in dynamic flow, according to the criterion cited in example 1 (less than 45 g/kg).

In the same way, compositions according to the invention were prepared starting from the slaked lime of example 1, so as to contain 2% by weight respectively of expanded or exfoliated vermiculite, expanded perlite and attapulgite. The size of the particles of these additives is greater than 90 µm. The results of the test are respectively 31, 38 and 39 g/kg of product accumulated on the walls with respect to the measured weight, characteristic values of the compositions having very good behaviour in dynamic flow.

In order to demonstrate the benefit of the powdery compositions based on calco-magnesian compounds according to the invention on the quality of their flow, it is useful to express the results of the dynamic flowing tests in terms of percentage reduction in the quantity accumulated on the walls, compared with the case of the reference calco-magnesian compound without additive. Reductions of 38%, 52%, 42% and 40% are obtained respectively for the compounds containing respectively raw vermiculite, expanded vermiculite, expanded perlite and attapulgite.

On the other hand, if talc, sepiolite or bentonite are added as an additive, to the extent of 2% by weight of the final composition, the results of the test are respectively 64, 60 and 84 g/kg of product accumulated on the walls with respect to the measured weight. These additives result in the obtaining of a formula having poor behaviour in dynamic flow (results>58 g/kg), or even a greatly degraded flow compared with the compounds without additive, in the case of bentonite.

All these results are summarised in Table 1.

TABLE 1

Results of the dynamic flowing test for the reference slaked lime, compositions based on this lime, according to the invention, and compositions with additives not improving dynamic flow.

| Composition tested | Ratio by weight of product accumulated on the walls [g/kg] | Percentage reduction in accumulation on the walls compared with slaked lime |
|---|---|---|
| Reference slaked lime | 65 | — |
| 2% mixture by weight of raw vermiculite | 40 | 38% |
| 2% mixture by weight of expanded vermiculite | 32 | 52% |
| 2% mixture by weight of expanded perlite | 38 | 42% |
| 2% mixture by weight of attapulgite | 39 | 40% |
| 2% mixture by weight of talc | 64 | 2% |
| 2% mixture by weight of sepiolite | 60 | 8% |
| 2% mixture by weight of bentonite | 84 | −30% |

Example 3

In this example 3, the additives of example 2 were subjected to a granulometric cut by sieving, so as to retain only particles less than 125 μm.

To the same slaked lime as in example 1, "raw" vermiculite<125 μm is added, to the extent of 2% by weight of the composition thus obtained, which is mixed in order to homogenise it. The composition is then subjected to the dynamic flow test, under the same conditions as in example 1. The result of the test shows very severe deterioration in flow compared with the lime without additive with 122 g/kg of material stuck to the walls.

In the same way, compositions were prepared starting from the slaked lime of example 1 so as to obtain mixtures containing 2% by weight respectively of expanded vermiculite<125 μm, attapulgite<125 μm and sand<125 μm. The results of the test are respectively 62, 58 and 57 g/kg of product accumulated on the walls with respect to the measured mass. These formulae therefore exhibit poor behaviour in dynamic flow, with respectively only 5%, 11% and 13% reduction in sticking to the walls.

These results demonstrate the critical character of the distribution of particle sizes of the additive used in the invention, an additive which loses its efficacy if it is too fine.

All the results of example 3 are summarised in table 2.

TABLE 2

Results of the dynamic flow test for the reference slaked lime and in the case of formulae based on additives <125 μm.

| Composition tested | Ratio by weight of product accumulated on the walls [g/kg] | Percentage reduction in accumulation on the walls compared with slaked lime |
|---|---|---|
| Reference slaked lime | 65 | — |
| 2% mixture by weight of raw vermiculite <125 μm | 122 | −88% |
| 2% mixture by weight of expanded vermiculite <125 μm | 62 | 5% |
| 2% mixture by weight of attapulgite <125 μm | 58 | 11% |
| 2% mixture by weight of sand <125 μm | 57 | 13% |

Example 4

In this example 4, the additives of example 2 were subjected to a granulometric cut by sieving, so as to retain only the particles greater than 250 μm.

"Raw" vermiculite>250 μm is added to the same slaked lime as in example 1, to the extent of 2% by weight of the composition thus obtained, which is mixed in order to homogenise it. The composition is then subjected to the dynamic flowing test, under the same conditions as in example 1. The result of the test shows an appreciable improvement in flow compared with the lime without additive with only 39 g/kg of material stuck to the wall, that is to say a reduction of 41% compared with the non-treated lime.

In the same way, compositions were prepared starting from the slaked lime of example 1, so as to obtain mixtures containing 2% by weight, respectively of expanded vermiculite>250 μm, attapulgite>250 μm and sand>250 μm. The results of the test are respectively 32, 39 and 42 g/kg of product accumulated on the walls compared with the dosed mass, a sign of compositions having very good behaviour in dynamic flow. Respectively 52%, 40% and 35% reductions in sticking to the walls are obtained.

These results confirm the decisive character of the size distribution of the particles of the additive.

However, if limestone>250 μm or raw dolomite (mixed calcium and magnesium carbonate)>250 μm are used as an additive to the lime of example 1, to the extent of 2% by weight of the final mixture, the masses stuck to the walls during the test will be respectively 53 and 52 g/kg. For the record, good behaviour in dynamic flow is characterised by a degree of sticking to the walls of less than 45 g/kg. The latter formulae therefore do not have satisfactory behaviour in dynamic flow.

Therefore the fact of having additives where the size of the particles is coarse, that is to say greater than 250 μm, is not a sufficient condition for obtaining a composition having good dynamic flow.

All the results of example 4 are summarised in Table 3.

TABLE 3

Results of the dynamic flowing test for the reference slaked lime, and in the case of compositions based on additives >250 μm.

| Composition tested | Ratio by weight of product accumulated on the walls [g/kg] | Percentage reduction in accumulation on the walls compared with slaked lime |
|---|---|---|
| Reference slaked lime | 65 | — |
| 2% mixture by weight | 39 | 41% |

TABLE 3-continued

Results of the dynamic flowing test for the reference slaked lime, and in the case of compositions based on additives >250 μm.

| Composition tested | Ratio by weight of product accumulated on the walls [g/kg] | Percentage reduction in accumulation on the walls compared with slaked lime |
|---|---|---|
| of raw vermiculite >250 μm | | |
| 2% mixture by weight of expanded vermiculite >250 μm | 32 | 52% |
| 2% mixture by weight of attapulgite >250 μm | 39 | 40% |
| 2% mixture by weight of sand >250 μm | 42 | 35% |
| 2% mixture by weight of lime >250 μm | 53 | 20% |
| 2% mixture by weight of raw dolomite >250 μm | 52 | 18% |

Example 5

The reference slaked lime of example 1 was selected in a dynamic separator, so as to keep only the particles less than 20 μm. This selected slake lime was tested on the dynamic flow device under the same conditions as in example 1. However, this selected lime has less good flow than the reference lime, because of its greater fineness; it was possible to measure out only 0.75 kg of lime before total blockage of the test device. The mass accumulated on the walls, referred to as the measured mass, is 97 g/kg.

A composition according to the invention was prepared starting from this selected slake lime, so as to obtain respectively a composition containing 2% and 4% of expanded vermiculite. In both cases, it is possible to measure out 2 kg of composition without blocking the device. Moreover, the mass accumulated on the walls, referred to the measured-out mass, is 39 g/kg for the composition with 2% vermiculite and 22 g/kg for that with 4% vermiculite. The reduction in mass accumulated on the walls with respect to the selected slake lime is respectively 60% and 77%.

The results of example 5 are summarised in table 4.

TABLE 4

Results of the dynamic flow test for the selected slake lime and the compositions according to the invention based on this lime.

| Composition tested | Ratio by weight of product accumulated on the walls [g/kg] | Percentage reduction in accumulation on the walls compared with slaked lime |
|---|---|---|
| Selected slaked lime | 97 | — |
| 2% mixture by weight of expanded vermiculite | 39 | 60% |
| 4% mixture by weight of expanded vermiculite | 22 | 77% |

Naturally the present invention is in no way limited to the embodiments described above and many modifications can be made thereto without departing from the scope of the accompanying claims.

The invention claimed is:

1. Powdery composition which includes as a first component a calcic compound complying with formula I $$xCaA.(1-x)[yMgA+(1-y)MgO], \quad (I)$$

in which

A is a $=(OH)_2$ or $=CO_3$ group, and x and y are molar fractions where $0<x<1$ and $0<y<1$, and which includes as a second component in the powdery composition a quantity of a mineral solid flow agent in the form of particles having a size greater than 90 μm, said quantity of mineral solid flow agent being greater than zero and less than 5% by weight of the powdery composition;

wherein the calcic compound which is included as the first component of the powdery composition has a particle size less than 250 μm; and characterized in that the mineral solid flow agent is attapulgite.

2. Powdery composition which includes as a first component a calcic compound complying with formula I $$xCaA(1-x)[yMgA+(1-y)MgO], \quad (I)$$

in which

A is a $=(OH)_2$ group, and x and y are molar fractions where $0<x<1$ and $0<y<1$, and which includes as a second component in the powder composition a quantity of a mineral solid flow agent in the form of particles having a size greater than 90 μm, aid quantity of mineral solid flow agent being greater than zero and less than 5% by weight of the powdery composition; wherein the calcic compound which is included as the first component of the powdery, composition has a particle size less than 250 μm; and characterized in that the mineral solid flow agent is raw vermiculite.

3. Powdery composition which includes as a first component a calcic compound complying with formula I $$xCaA(1-x)[yMgA+(1-y)MgO], \quad (I)$$

in which

A is a $=(OH)_2$ group, and x and y are molar fractions where $0<x<1$ and $0<y<1$, and which includes as a second component in the powder composition a quantity of a mineral solid flow agent in the form of particles having a size greater than 90 μm, said quantity of mineral solid flow agent being greater than zero and less than 5% by weight of the powdery composition; wherein the calcic compound which is included as the first component of the powdery, composition has a particle size less than 250 μm; and characterized in that the mineral solid flow agent is expanded vermiculite.

4. Powdery composition which includes as a first component a calcic compound complying with formula I $$xCaA.(1-x)[yMgA+(1-y)MgO], \quad (I)$$

in which

A is a $=(OH)_2$ group, and x and y are molar fractions where $0<x<1$ and $0<y<1$, and which includes as a second component in the powdery composition a quantity of a mineral solid flow agent selected from the group consisting of vermiculite, perlite, diatomaceous earth and silica, in the form of particles having a size greater than 90 μm, said quantity of mineral solid flow agent being greater than zero and less than 5% by weight of the powdery composition;

wherein the calcic compound which is included as the first component of the powdery composition has a particle size less than 250 μm; and characterized in that the mineral solid flow agent is expanded perlite.

5. Composition according to claim 3, characterized in that the calcic compound is at a degree of purity greater than 90%.

6. Composition according to claim 3, characterized in that the calcic compound which makes up a first component of the powdery composition has a particle size of less than 20 μm.

7. Powdery composition which includes as a first component a calcic compound complying with formula I $$x\text{CaA}.(1-x)[y\text{MgA}+(1-y)\text{MgO}], \tag{I}$$

in which

A is a =(OH)$_2$ or =CO$_3$ group, and x and y are molar fractions where 0<x<1 and 0<y<1, and which includes as a second component in the powdery composition a quantity of a mineral solid flow agent in the form of particles having a size greater than 90 μm, said quantity of mineral solid flow agent being greater than zero and less than 5% by weight of the powdery composition;

wherein the calcic compound which is included as the first component of the powdery composition has a particle size less than 250 μm; and characterized in that the mineral solid flow agent is raw vermiculite.

8. Powdery composition which includes as a first component a calcic compound complying with formula I $$x\text{CaA}.(1-x)[y\text{MgA}+(1-y)\text{MgO}], \tag{I}$$

in which

A is a =(OH)$_2$ or =CO$_3$ group, and x and y are molar fractions where 0<x<1 and 0<y<1, and which includes as a second component in the powdery composition a quantity of a mineral solid flow agent in the form of particles having a size greater than 90 μm, said quantity of mineral solid flow agent being greater than zero and less than 5% by weight of the powdery composition;

wherein the calcic compound which is included as the first component of the powdery composition has a particle size less than 250 μm; and characterized in that the mineral solid flow agent is expanded vermiculite.

9. Composition according to claim 3 characterized in that it contains the flow agent in a quantity of less than or equal to 3% by weight.

10. Composition according to claim 3, characterized in that the mineral solid flow agent has a particle size greater than 125 μm.

* * * * *